United States Patent [19]

Scott

[11] 4,131,014

[45] Dec. 26, 1978

[54] DYNAMIC TIMING INDICATING APPARATUS

[75] Inventor: Ronald K. Scott, Buda, Ill.

[73] Assignee: Caterpillar Tractor Co., Peoria, Ill.

[21] Appl. No.: 804,408

[22] Filed: Jun. 7, 1977

[51] Int. Cl.² .............................................. G01M 15/00
[52] U.S. Cl. .................................................... 73/119 A
[58] Field of Search ..................... 73/116, 118, 119 A, 73/117.3; 324/16 T

[56] References Cited

U.S. PATENT DOCUMENTS

| | | | |
|---|---|---|---|
| 3,383,592 | 5/1968 | Williamson | 73/118 |
| 3,775,672 | 11/1973 | Letosky | 324/16 R |
| 4,023,403 | 5/1977 | Smith | 73/119 A |

*Primary Examiner*—Jerry W. Myracle
*Attorney, Agent, or Firm*—John L. James

[57] ABSTRACT

Dynamic timing indicating apparatus has comparing, zero-crossing detecting and automatic indicating apparatus. The comparing apparatus receives a first input signal and delivers an output signal in response to the input signal. The zero-crossing detection apparatus receives a second input signal which has a zero cross-over portion and occurs in timed relation to the first input signal and delivers an output in response to the second input signal. The indicating apparatus automatically indicates the timed relation between the first and second input signals in response to the outputs of the comparing and zero-crossing detecting apparatus.

20 Claims, 6 Drawing Figures

DYNAMIC TIMING INDICATING APPARATUS

BACKGROUND OF THE INVENTION

Many mechanisms, such as diesel engines for example, have parts which cooperate in timed relation to produce a desired result. In diesel engines the cooperative timed relation between the injection of fuel and a selected piston reaching the top dead center of its stroke is called timing. Timing must be set to the manufacturer's specification for optimum service.

The top dead center position of the selected piston is commonly noted by a hole or slot on the periphery of the flywheel. The slot can be seen with the aid of a timing light when the engine is operating at a preselected speed and timing can be measured by an operator.

An edge of the slot is used to trigger electronic equipment which can measure timing. A large slot may introduce error because the edge of the slot may not represent top dead center. It is desirable to measure from the center of the slot and reduce error introduced by slots of varying widths.

It is therefore desirable to have a service tool which automatically measures timing and prevents the introduction of visual error which is often amplified by slots of varying widths. It is also desirable to measure timing at any engine speed.

SUMMARY OF THE INVENTION

The present invention is directed to overcoming one or more of the problems as set forth above.

According to the present invention, dynamic timing indicating apparatus has comparing means, zero-crossing detecting means and automatic indicating means. The comparing means receives a first input signal and delivers a preselected output signal in response to the first input signal. The zero-crossing detecting means receives a second input signal which has a zero crossover portion occurring in timed relation to the first signal and delivers a preselected output signal in response to the second input signal. The indicating means automatically indicates the timed relation between the first and second input signals in response to the outputs of the comparing means and zero-crossing detecting means.

DETAILED DESCRIPTION

Figure 1:
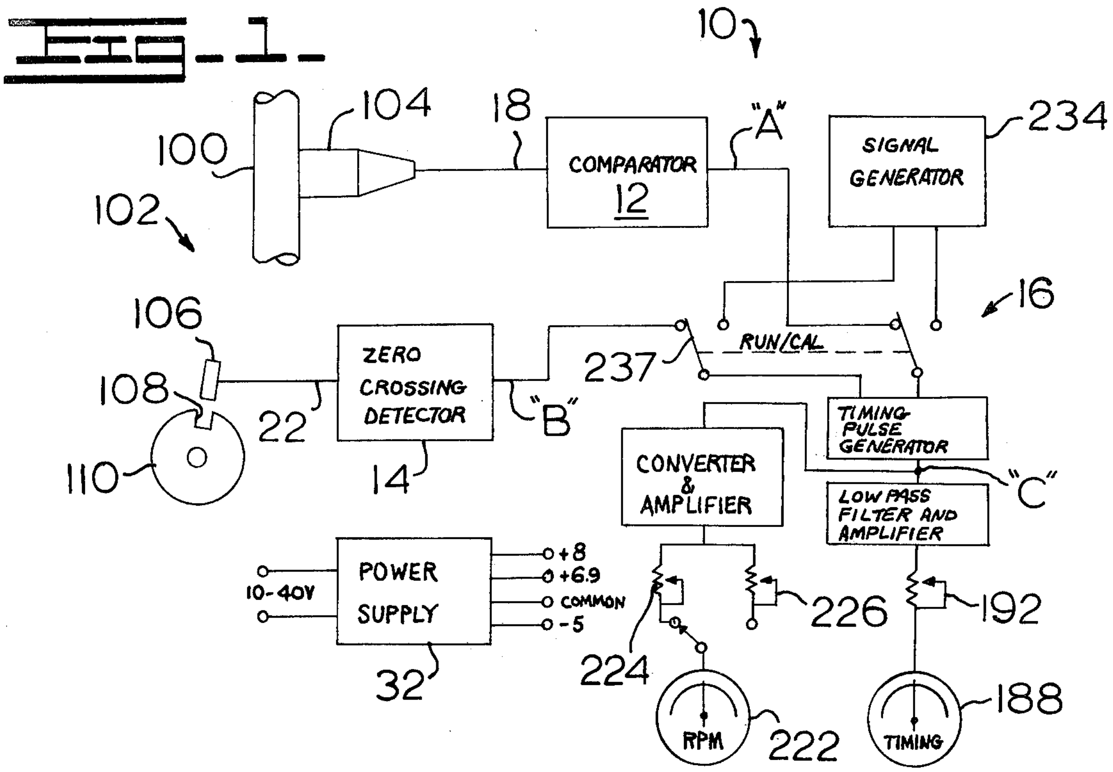
FIG. 1 is a block diagram of the present invention.
Figure 2:
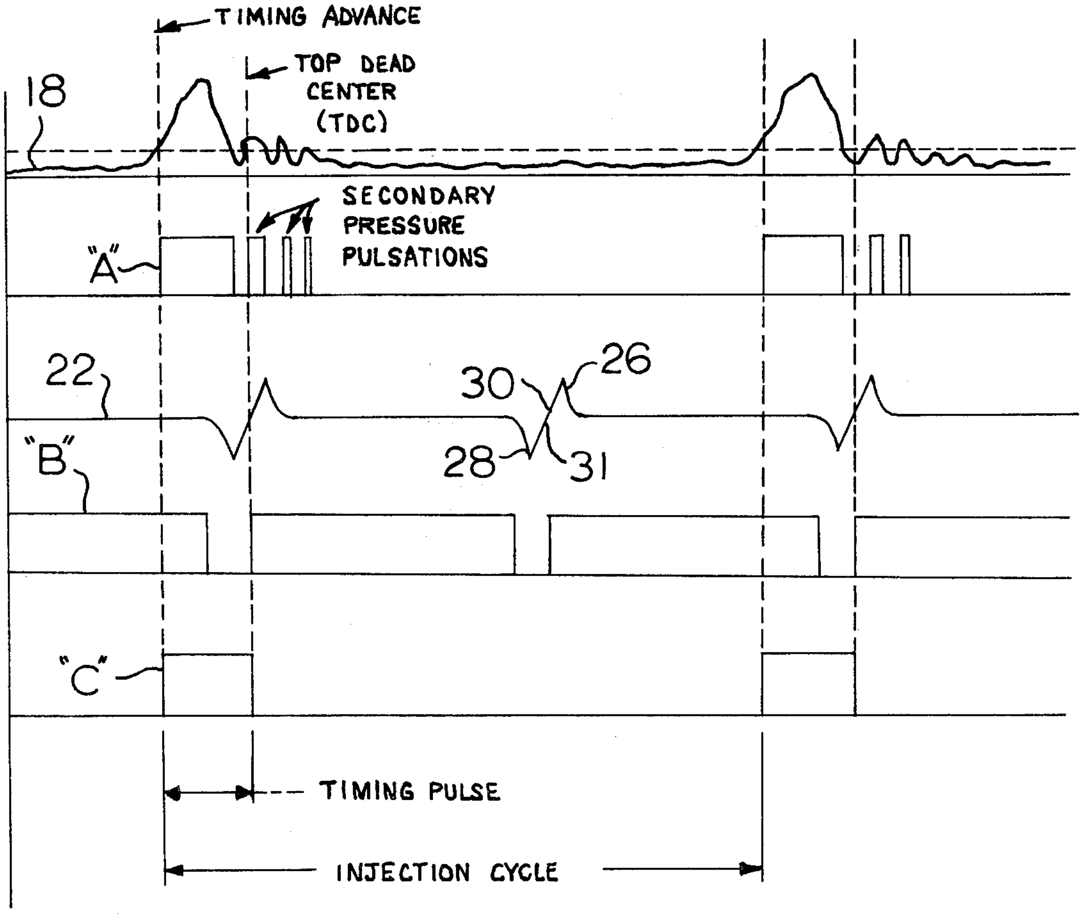
FIG. 2 is a graphic diagram of the inputs and outputs of various components of the invention.
Figure 3:
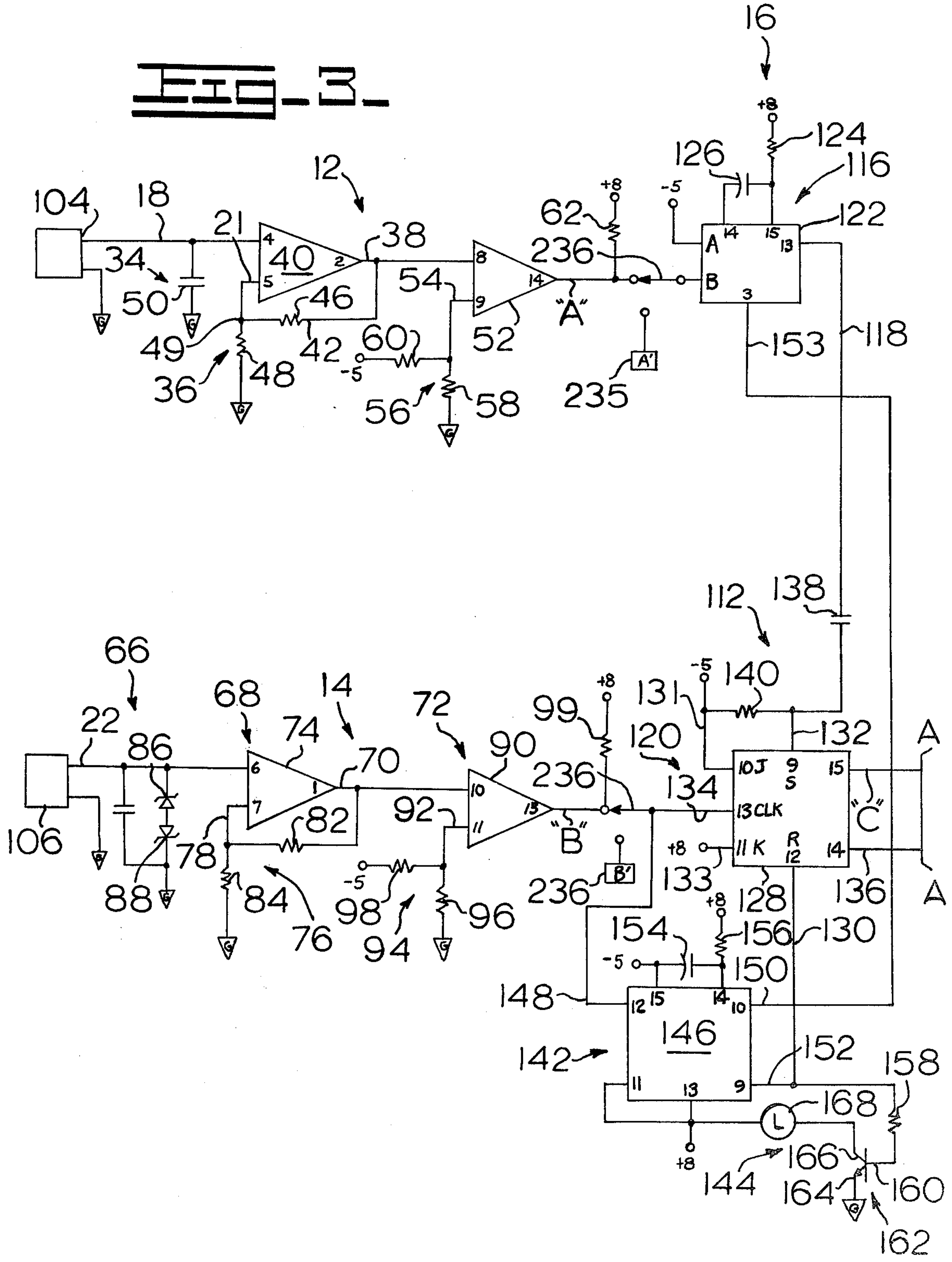
FIG. 3 is a partial schematic diagram of the invention which is connected to FIG. 4 at line A—A.

Referring to FIGS. 1 and 2, the dynamic timing apparatus 10 of this invention includes comparing means 12, and zero-crossing detecting means 14 cooperatively interconnected with automatic indicating means 16. The comparing means 12 receives a first input signal 18 and delivers a preselected output signal "A" to the indicating means 16, preferably in response to the first input signal 18 being greater than a preselected reference magnitude input 21 (FIG. 3). The zero-crossing detecting means 14 receives a second input signal 22 and delivers a preselected output signal "B" to the indicating means 16 in response to the second input signal 22. The second input signal 22 has positive, negative, and zero-crossover portions 26, 28, 30 occurring in timed relation to the first input signal 18. The output signal "B" is preferably initiated in response to the second input signal 22 substantially reaching a zero point 31 of the zero crossover portion 30 during changing of the second input signal 22 from the negative portion 28 to the positive portion 26. The indicating means 16 automatically indicates the timed relation between the input signals 18, 22 in response to and as a function of output signals "A" and "B". The timing apparatus 10 also includes means for providing a plurality of reference voltages, such as a power supply 32 having regulated positive and negative outputs and a variable input.

Referring to FIG. 3, the comparing means 12 preferably includes means 34 for limiting the first input signal 18 to a preselected magnitude and means 36 for producing the reference magnitude 21, comparing the first input signal 18 to the reference magnitude input 21, and producing an output 38 in response to the first input 18 exceeding the reference magnitude input 21.

The reference magnitude producing means 36 preferably includes an operational amplifier 40 and a voltage divider 42. The amplifier 40 receives the first input signal 18 and the reference magnitude input 21 and delivers the output 38. The voltage divider 42 preferably includes first and second resistors 46, 48 connected one to the other at junction 49 and to the reference magnitude input 21. The first resistor 46 is also connected to the output 38 and the second resistor 48 is connected to the zero reference voltage of the power supply 32.

The limiting means 34 filters the first input signal 18 and preferably includes a capacitor 50 connected to the first signal input 18 at the amplifier 40 and connected to the zero reference voltage.

One skilled in the art can readily calculate appropriate values for the various components once the characteristics of the input signals 18, 22 are known. While the operational amplifier 40 is preferably an integrated circuit, discrete components can be used.

The output signal 38 of the amplifier 40 is received by a second operational amplifier 52 which compares output signal 38 with a reference magnitude input 54 and delivers output signal "A" in response to the signal 38 exceeding the reference magnitude input 54. The amplifier 52 includes a voltage divider 56 which preferably includes first and second resistors 58, 60 connected to the reference magnitude input 54. The resistors 58, 60 are connected to zero and negative reference voltages, respectively. A third resistor 62 is preferably connected to the output 20.

Referring to FIG. 3, the zero-crossing detecting means 14 preferably includes means 66 for limiting the second input signal 22 to preselected maximum and minimum magnitudes, means 68 for receiving the second input signal 22 and delivering an output 70 in response to the zero crossover portion 30 of second input signal 22, and means 72 for inverting and translating the output 70 to produce the output signal "B".

The receiving means 68 preferably includes an operational amplifier 74 and a voltage divider 76 which produces a reference magnitude 78.

The amplifier 74 receives the second input signal 22, which is preferably shielded, and the reference magnitude 78, and delivers the output 70 in response to the second input signal 22 exceeding the reference magnitude 78. The voltage divider 76 includes first and second resistors 82, 84 connected to the amplifier 74 in a manner completely similar to the manner in which the voltage divider 42 is connected to the operational amplifier 40.

The limiting means 66 preferably includes back-to-back zener diodes 86, 88 connected to the second signal input 22 at the amplifier 74 and to the zero reference voltage. The output 70 is normally a preselected negative value when the second input signal 22 is substantially zero and the output 70 becomes substantially zero when the second input signal 22 changes from zero to a preselected negative value. The output 70 remains substantially zero until the zero crossover portion 30 of the second signal 22 substantially reaches the zero point 31 which causes the output 70 to return to the preselected negative value.

The inverting means 72 includes an operational amplifier 90, reference magnitude input 92, and a voltage divider 94 having first and second resistors 96, 98. The amplifier 90 and voltage divider 94 are connected substantially similar to amplifier 52 and voltage divider 56 of the comparing means 12. A third resistor 99 is preferably connected to the output 24 and the positive voltage reference. The amplifier 90 receives output signal 70 and delivers output signal "B" which is the output signal 70 inverted.

Referring to FIGS. 1 and 2, the first signal 18 is preferably representative of pressure in a selected fuel injection line 100 of an engine 102 but can represent current flow to a spark plug or the like (not shown). A pressure transducer 104 senses pressure in the line 100 and generates a signal representative of the pressure. The transducer 104 or an amplifier (not shown) conditions the signal to deliver the first input signal 18 to the comparing means 12. The first input signal 18 preferably crosses through zero volts at a preselected pressure.

The second input signal 22 is preferably representative of a selected piston of the engine 102 reaching its top dead center position. The signal is preferably generated by a magnetic pickup unit 106 responsive to an opening 108, preferably a groove, in a flywheel 110. Fuel normally begins to flow in the line 100 before the selected piston reaches top dead center so that the first input signal 18 normally occurs before the second input 22.

Referring to FIG. 3, the automatic indicating means 16 includes means 112 for receiving output signal "A" and initiating an output signal "C" in response to receiving signal "A", and receiving output signal "B" and terminating the signal "C" in response to receiving signal "B".

The receiving means 112 includes means 116 for producing an output signal 118 of a preselected duration in response to output signal "A" and means 120 for producing the output signal "C". The time duration is sufficient for making secondary pressure pulses ineffective. Producing means 116 preferably includes a monostable multivibrator 122 which receives signal "A" and the negative voltage reference and delivers output signal 118. A resistor 124 is connected to the monostable 122 and to the positive reference voltage and a capacitor 126 is connected to the monostable 122. The values of the resistor 124 and the capacitor 126 determine the time duration of the monostable 122.

The producing means 120 preferably includes a J-K flip-flop 128 which has Reset and Set inputs 130, 132, J and K inputs 131, 133, and a clock input 134. The flip-flop 128 delivers output signal "C" and output 136 which is the complement of output "C". Signal "C" is a logic output and is either a logic "1" or logic "0" so that its complement, output 136, is a logic "0" when signal "C" is a logic "1" and vice-versa. The Set input 132 is coupled to output 118 of the monostable multivibrator 122 by a capacitor 138. A resistor 140 is connected to the Set input 132 and to the negative reference voltage which is connected to the J input 131 of the flip-flop 128, the K input 133 is connected to the positive voltage reference.

Signal 118 from the monostable multivibrator 122 sets the flip-flop 128 and initiates signal "C". A positive transition voltage of signal "B" to the clock input 134 causes output "C" to go to logic "0". The clock input 134 is coupled to signal "B" and terminates output "C" when top dead center is reached. The flip-flop 122 is operably connected to the positive and negative voltage references.

The Reset input 130 is preferably coupled to signal "B" by means 142 for detecting loss of at least one of the signals "A" and "B" and means 144 for indicating such loss.

The loss detecting means 142 includes a monostable multivibrator 146 which receives signal "B" at its input 148 and delivers first and second complementary outputs 150, 152. The monostable multivibrator 146 preferably has a time duration which is preferably substantially longer than the fuel injection cycle. The first output 150 is connected to a Reset input 153 of the monostable multivibrator 122 and restores the output 118 to its initial zero state. The second output 152 is connected to the Reset input 130 of the flip-flop 128 and terminates output signal "C". The monostable 146 is operably connected to the positive and negative voltage references. A capacitor 154 and a resistor 156 are connected to the monostable 146 and the resistor 156 is also connected to the positive voltage reference.

The loss of signal indicating means 144 includes a resistor 158 connected to the output 152 of the monostable multivibrator 146 and to a base 160 of a transistor 162. The transistor 162 has a grounded emitter 164 and a collector 166 connected through an indicating lamp 168 to the positive voltage reference. The transistor 162 and lamp 168 conduct when output 152 is a logic "1". Output 152 is a logic "1" when input 148 is zero for a period longer than the time duration of the monostable multivibrator 144 which occurs when signal "B" is not generated for several revolutions of the flywheel 110. If signal "B" is lost, output 150 becomes logic "0" and resets the monostable multivibrator 122 of the producing means 116 and output 152 becomes logic "1" and resets the flip-flop 120 setting signal "C" to zero. If signal "A" is lost, signal "B" resets the flip-flop 128 and signal "C" will go to zero. Thus signal "C" is zero if either signal "A" or "B" is lost which occurs with a loss of the input signals 118, 122.

Figure 4:
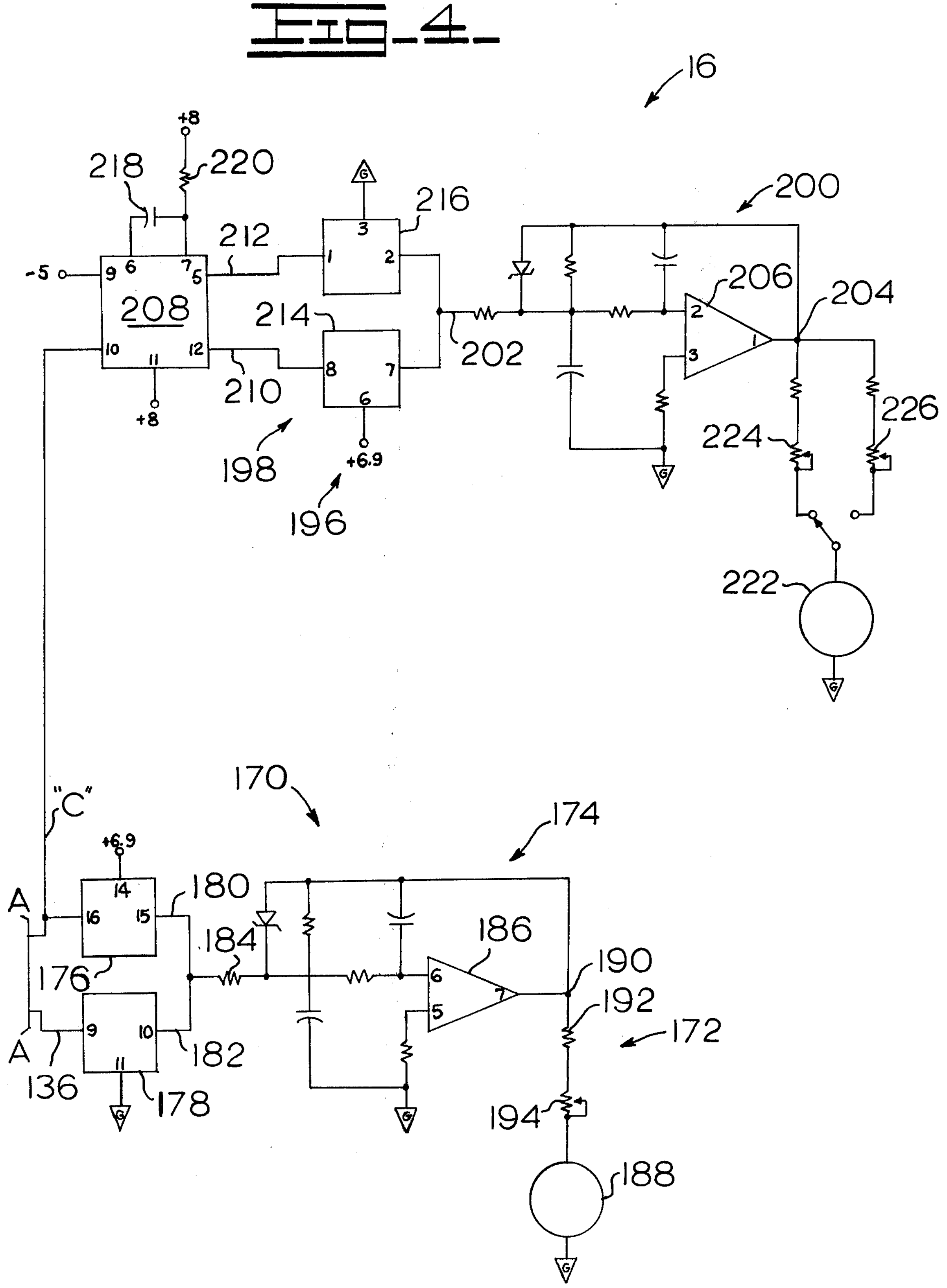
FIG. 4 is a partial schematic diagram of the invention which is connected to FIG. 3 at line A—A.

Referring to FIG. 4, the automatic indicating means 16 includes means 170 for time-averaging output signal "C" and means 172 for numerically indicating the time average of output "C". Signal "C", is time-averaged when its magnitude is spread or averaged over a complete cycle.

The time-averaging means 170 preferably includes an active low-pass filter 174 and first and second switching devices 176, 178 which are connected to signal "C" and the complementary signal 136, respectively. The switching device 176 receives signal "C" and delivers a preselected regulated positive output 180 and switching device 178 receives signal 136 and delivers a zero output 182. The switching devices 176, 178 are connected to regulated positive and zero voltage references, respectively. The outputs 180, 182 are connected to each other and to an input 184 to the low-pass filter 174. The filter 174 preferably includes an operational amplifier 186 as the active component.

One skilled in the art can readily determine a suitable arrangement of passive components for the filter 174. Greater accuracy is obtained by using switching devices 176, 178, rather than signal "C" and signal 136, because regulated outputs 180, 182 are delivered to the input 184 of the filter 174 to be averaged.

A meter 188 is connected to an output 190 of the filter 174 through fixed resistor 192 and adjustable resistor 194. The meter 188 is preferably a digital meter which is adjusted or calibrated by changing the resistance of the resistor 194. The sizes of the resistors 192, 194 depend upon the magnitude of the output 190 and input limitations of the meter used.

The automatic indicating means 16 includes means 196 for converting the output signal "C" to a signal responsive to the rate of repetition of a selected one of the first and second input signals 18, 22, preferably the first signal 18. The converting means 196 acts as a frequency to voltage converter and preferably includes a pulse generator 198 and an active low pass filter 200. The output signal "B" can be used instead of the output signal "C".

The filter 200 has an input 202, output 204, and an operational amplifier 206 as the active element and is completely similar to the los pass filter 174.

The pulse generator 198 includes a monostable multivibrator 208 which has a preselected time duration and which receives signal "C" and delivers complementary outputs 210, 212 to switching devices 214, 216, respectively, which are completely similar to switching devices 176, 178. A capacitor 218 is connected to the monostable 208 and a resistor 220 is connected to the monostable and to the positive voltage reference. The valves of the capacitor 218 and the resistor 220 determine the time duration of the monostable 208.

The switching devices 214, 216 are connected to the input 202 of the filter 200 and deliver a regulated signal thereto.

A meter 222 is connected to the filter output 204 by one of two variable resistance networks 224, 226. The resistance network 224, 226 used at any given time depends upon the speed of the engine 102.

Referring to FIGS. 2 and 4, the second input signal 22 occurs once per revolution of the flywheel 110 but the first input signal 18 occurs only once per two revolutions. Thus, signal "C" has a rate of repetition that is one-half the rate of repetition of the flywheel 110 and only half the engine 102 revolution. The frequency-to-dc converter 196 compensates for the reduced frequency by using the time duration of the monostable multivibrator 208 and regulated switching devices 214, 216.

Figure 5:
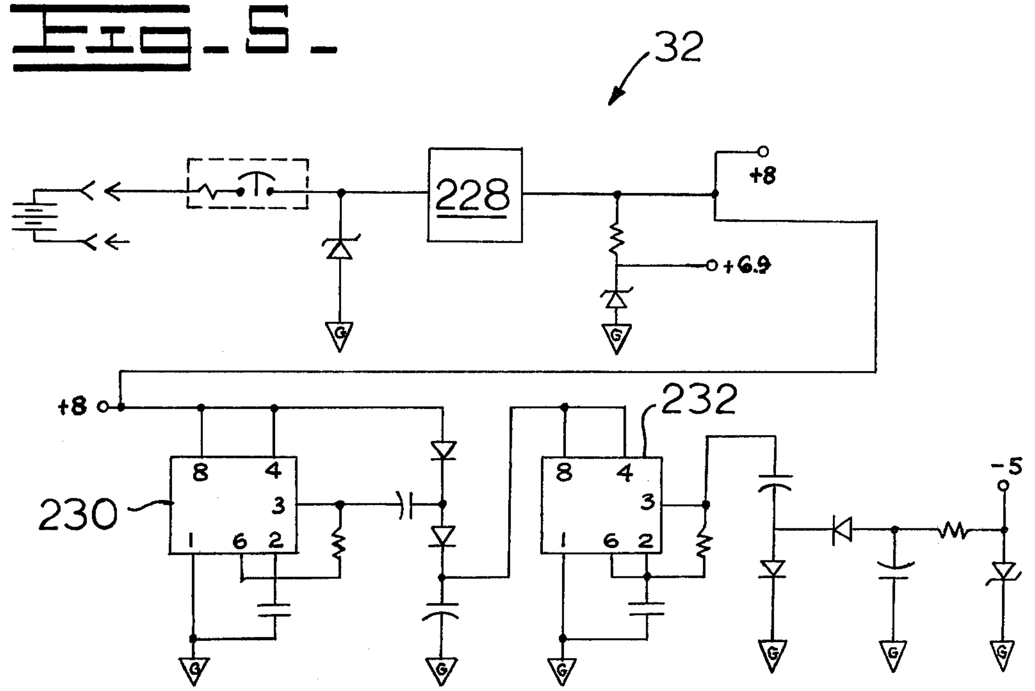
FIG. 5 is a partial schematic diagram of the power supply.

Referring to FIG. 5, the regulated power supply 32 includes a voltage regulator 228, and first and second switching devices 230, 232, and preferably delivers regulated outputs of 0, −5, 8, and 6.9 volts to the timing apparatus 10.

Figure 6:
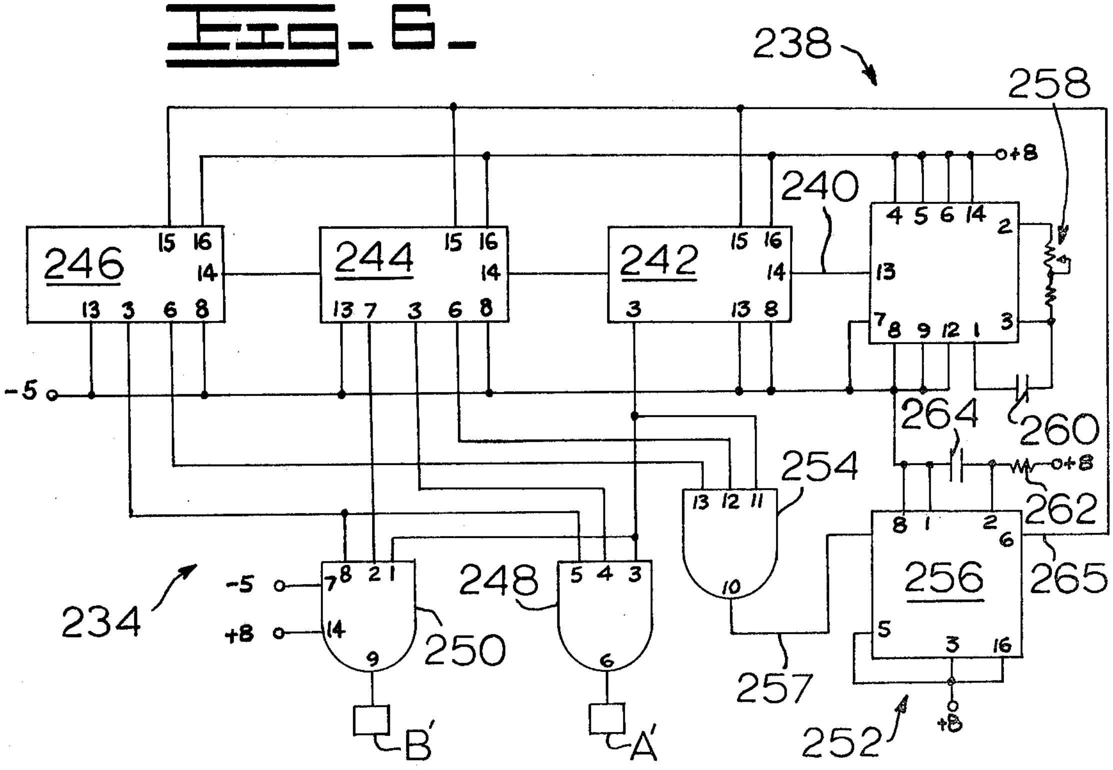
FIG. 6 is a partial schematic diagram of the signal generating means.

Referring to FIG. 6, the timing apparatus 10 preferably includes means 234 for generating preselected signals A′ and B′ which are substantially similar in timed relation to output signals "A" and "B". Signals A′ and B′ are preferably connected to the automatic indicating means 16 by switching means 237, such as a single pole, double throw switch (FIG. 3). The switching means 237 switches the automatic indicating means 16 from the comparing means 12 and zero crossing detecting means 14 to the generating means 234.

The generating means 234 preferably includes oscillator means 238 for producing an output 240 of a preselected frequency. First, second and third decade counters 242, 244, 246 are connected in series one to the other and in series with the oscillating means 238.

The generating means 234 includes means 248, 250 for producing outputs A′, B′ respectively, such as an AND logic circuits, in response to selected outputs of the counters, 242, 244, 246. Means 252 are provided for resetting the counters, which include an AND logic circuit 254 which is connected to the counters and a monostable multivibrator 256 which is connected to the logic circuit 254 by conductor 257.

The oscillator 238 is operably connected to the positive and negative reference voltages. A variable resistance network 258 is connected to the oscillator 238 and a capacitor 260 is connected to the oscillator 238 and resistance network 258. Monostable 256 is connected to the positive and negative reference voltages and a resistor 262 which is connected to the positive reference. A capacitor 264 is connected to the monostable 256 and to the negative reference. The monostable delivers an output signal 265 which resets each of the counters 242, 244, 246.

Each counters 242, 244, 246 is connected to the positive and negative references. The first counter 242 is operably connected to each of the logic circuits 248, 250, 254 when its count is preferably zero. The second counter 244 is operably connected to each of the logic circuits 248, 250, 254, respectively, when its count is preferably zero, three and two, respectively. Counter three 246, is operably connected to the logic circuits 248, 250 when its count is zero and to the logic circuit 254 when its count is seven.

Thus, the AND logic circuit 248 delivers signal "A′" when the count is "000" and AND logic circuit 250 delivers signal "B′" when the count is "030". The counters reset to count "000" when count "720" is reached. Thus, signal A′ is delivered thirty degrees of revolution before signal B′. The counters reset once for every two revolutions.

As mentioned the components, such as the operational amplifier 40, are preferably integrated circuits. The following table lists the components used in the present invention. While the components listed below are preferred, other components which have the same vital characteristics may be used.

| Component | Reference No. | Manufacturer | Model No. |
|---|---|---|---|
| Operational Amplifier | 40,50,52,74 | National Semiconductor | 74C909 |
| Operational Amplifier | 186, 206 | Raytheon | RC1458-DN |
| Multivibrator | 122, 208 | National Semiconductor Solid State | 74C221 |

-continued

| Component | Reference No. | Manufacturer | Model No. |
|---|---|---|---|
| Multivibrator | 146, 256 | Scientific Solid State | 4528 |
| Flip-Flop | 128 | Scientific | 4027 |
| Oscillator | 238 | RCA Solid State | 4047 |
| Counters | 242,244,246 | Scientific Solid State | 4017 each |
| Logic Circuit | 248,250,254 | Scientific Solid State | 4073B |
| Switching Devices | 176,178,214,216 | Scientific | 4066 |
| Transistor | 162 | Motorola | 2N3417 |
| Voltage Regulator | 228 | National Semiconductor | LM340 |
| Switching Devices | 230, 232 | Signetics | 555 each |
| Pressure Pickup | 104 | Serta Systems | 210 |
| Magnetic Pickup | 106 | Transducer Systems | |

OPERATION

In the operation of the timing apparatus 10, the first input signal 18 is received once every second revolution of the engine 102 and the second input signal 22 is received once every revolution (FIGS. 1 and 2). The comparing means 12 receives the first input signal 18 and delivers output "A'" in response to the input signal 18 exceeding the preselected reference magnitude 21. The zero-crossing detecting means 14 receives the second input signal 22 and delivers output "B" in response to the second input 22 substantially reaching the zero-crossover portion 30 when it changes from the negative portion 28 to positive portion 26. Signal "A'" has a time duration sufficient for nullifying the effect of secondary pressure pulsations.

The automatic indicating means 16 initiates output "C" in response to signal "A" and terminates signal "C" in response to signal "B". Signal "C" is averaged and displayed on the meter 188 to indicate timing. Signal "C" is converted, averaged and displayed on the meter 222 to indicate the speed of the engine 102. The generating means 234 is selectively connected to the automatic indicating means 16 by an operator to calibrate the meters 188, 222. A loss of signal "B" is indicated by the indicating lamp 168.

By this construction, the timing apparatus automatically measures timing at any engine speed. The timing apparatus prevents the introduction of visual error because the operator reads timing and engine speed directly from the meters 188, 222.

Other objects, aspects and advantages will become apparent from a study of the specification, drawings and appended claims.

The embodiments of the invention in which an exclusive property or privilege is claimed are defined as follows:

1. Dynamic timing indcating apparatus, comprising:
comparing means for receiving a first input signal and delivering a preselected output signal "A" in response to said first input signal;
zero-crossing detecting means for receiving a second input signal having positive, negative, and zero-crossover portions occurring in timed relation to said first signal and delivering a preselected output signal "B" in response to said zero-crossover portion of said second input signal;
means for automatically indicating the timed relation between said first and second input signals in response to and as a function of the outputs of said comparing means and zero-crossing detecting means; and
means for detecting a loss of at least one of said output signal "A" and "B".

2. An apparatus, as set forth in claim 1, wherein said comparing means compares said first input signal to a preselected reference magnitude and delivers output signal "A" in response to said first input signal being greater than said reference magnitude.

3. An apparatus, as set forth in claim 2, wherein the comparing means includes means for producing said reference magnitude, comparing said first input signal to said reference magnitude, and producing an output in response to said first input signal exceeding said reference magnitude.

4. An apparatus, as set forth in claim 1, wherein delivery of the preselected output signal "B" of said zero crossing detecting means is initiated in response to said second input signal substantially reaching the crossover portion during changing of said second signal from negative to positive.

5. An apparatus, as set forth in claim 1, wherein said automatic indicating means includes means for receiving said output signal "A" from said comparing means and initiating an output signal "C" in response to receiving signal "A", and receiving said output signal "B" and terminating said output signal "C" in response to receiving signal "B".

6. An apparatus, as set forth in claim 5, including means for time-averaging said output signal "C".

7. An apparatus, as set forth in claim 6, including means for numerically indicating the time average of said output signal "C".

8. An apparatus, as set forth in claim 5, wherein said second input signal is repetitive and including means for converting said output signal "C" to a signal responsive to the rate of repetition of a selected one of said first and second input signals.

9. An apparatus, as set forth in claim 5, wherein the receiving means includes means for producing said output signal "C".

10. An apparatus, as set forth in claim 1, wherein said zero-crossing detecting means includes means for receiving said second input signal and delivering an output in response to said zero crossover portion of said signal and means for translating said output to produce said output signal "B".

11. An apparatus, as set forth in claim 10, wherein the receiving means includes an operational amplifier having a signal input for receiving said second input signal, a reference magnitude input and an output.

12. An apparatus, as set forth in claim 11, wherein said second input signal is shielded.

13. Dynamic timing indicating apparatus, comprising:
comparing means for receiving a first input signal and delivering a preselected output signal "A" in response to said first input signal;
zero-crossing detecting means for receiving a second input signal having positive, negative, and zero-crossover portions occurring in timed relation to said first signal and delivering a preselected output signal "B" in response to said zero-crossover portion of said second input signal;
means for automatically indicating the timed relation between said first and second input signals in response to and as a function of the outputs of said comparing means and zero-crossing detecting means; and means for generating preselected signals substantially similar in timed relation to said output signals "A" and "B".

14. An apparatus, as set forth in claim 13, including means for switching said automatic indicating means from said comparing means and zero crossing detecting means to said generating means.

15. Dynamic timing indicating apparatus, comprising:

comparing means for receiving a first input signal and delivering a preselected output signal "A" in response to said first input signal;

zero-crossing detecting means for receiving a second input signal having positive, negative, and zero-crossover portions occurring in timed relation to said first signal and delivering a preselected output signal "B" in response to said zero-crossover portion of said second input signal;

means for automatically indicating the timed relation between said first and second input signals in response to and as a function of the outputs of said comparing means and zero-crossing detecting means; and means for detecting a loss of at least one of said output signals "A" and "B" and means for indicating such loss.

16. An apparatus, as set forth in claim 15, wherein the loss detecting means includes a monostable multivibrator having an input and first and second outputs, said second output being the complement of said first output, said input being coupled to said output signal "B".

17. An apparatus, as set forth in claim 16, wherein the indicating means includes a transistor having an input coupled to said second output and an indicating lamp coupled to said transistor so that said lamp is energized when said transistor conducts.

18. Dynamic timing indicating apparatus, comprising:

comparing means for receiving a first input signal and delivering a preselected output signal "A" in response to said first input signal;

zero-crossing detecting means for receiving a second input signal having positive, negative, and zero-crossover portions occurring in timed relation to said first signal and delivering a preselected output signal "B" in response to said zero-crossover portion of said second input signal;

means for automatically indicating the timed relation between said first and second input signals in response to and as a function of the outputs of said comparing means and zero-crossing detecting means; and means for limiting said second input signal to preselected maximum and minimum magnitudes.

19. An apparatus, as set forth in claim 18, wherein the limiting means includes back-to-back zener diodes connected to said signal and reference magnitude inputs.

20. Dynamic timing indicating apparatus, comprising:

comparing means for receiving a first input signal and delivering a preselected output signal "A" in response to said first input signal;

zero-crossing detecting means for receiving a second input signal having positive, negative, and zero-crossover portions occurring in timed relation to said first signal and delivering a preselected output signal "B" in response to said zero-crossover portion of said second input signal; and means for automatically indicating the timed relation between said first and second input signals in response to and as a function of the outputs of said comparing means and zero-crossing detecting means, said automatically indicating means including means for receiving said output signal "A" from said comparing means and initiating an output signal "C" in response to receiving signal "A", and receiving said output signal "B" and terminating said output signal "C" in response to receiving signal "B", said receiving means including means for producing an output signal of a preselected time duration in response to said output signal "A".

* * * * *